(12) United States Patent
Dowd et al.

(10) Patent No.: US 11,880,084 B2
(45) Date of Patent: Jan. 23, 2024

(54) CABLE TO REDUCE OPTICAL FIBER MOVEMENT AND METHODS TO FABRICATE

(71) Applicant: Weatherford Technology Holdings, LLC, Houston, TX (US)

(72) Inventors: Edward M. Dowd, Madison, CT (US); Domino Taverner, Bethany, CT (US); John J. Grunbeck, Northford, CT (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 18/106,013

(22) Filed: Feb. 6, 2023

(65) Prior Publication Data

US 2023/0367093 A1 Nov. 16, 2023

Related U.S. Application Data

(62) Division of application No. 16/511,190, filed on Jul. 15, 2019, now Pat. No. 11,598,928.

(60) Provisional application No. 62/701,157, filed on Jul. 20, 2018.

(51) Int. Cl.
*G02B 6/44* (2006.01)
*B23K 26/24* (2014.01)

(52) U.S. Cl.
CPC ............ *G02B 6/4488* (2013.01); *B23K 26/24* (2013.01); *G02B 6/443* (2013.01); *G02B 6/4438* (2013.01); *G02B 6/4485* (2013.01)

(58) Field of Classification Search
CPC .... G02B 6/4488; G02B 6/443; G02B 6/4485; G02B 6/4438; B23K 26/24
See application file for complete search history.

(56) References Cited

U.S. PATENT DOCUMENTS

| 4,037,922 A | 7/1977 | Claypoole |
| 4,213,672 A | 7/1980 | Aulich et al. |
| 4,522,464 A | 6/1985 | Thompson et al. |
| 4,640,576 A | 2/1987 | Eastwood et al. |
| 4,759,487 A | 7/1988 | Karlinski |
| 4,852,790 A | 8/1989 | Karlinski |
| 5,046,815 A | 9/1991 | Cain et al. |
| (Continued) | | |

FOREIGN PATENT DOCUMENTS

| DE | 3309996 A1 | 9/1984 |
| DE | 4236608 A1 | 5/1994 |

OTHER PUBLICATIONS

Examination Report in EP Appl. 19756039.4 dated Oct. 31, 2022.
(Continued)

*Primary Examiner* — Joseph L Williams
(74) *Attorney, Agent, or Firm* — Cabello Hall Zinda, PLLC

(57) ABSTRACT

Certain aspects of the present disclosure provide techniques for making armored cables. An example method for making an armored cable includes forming a strip stock into an armor tubing; welding a seam of the armor tubing in a welding zone; inserting at least one of a first optical fiber or a first wire into a first end of a first guide tube, wherein: the first guide tube extends through the welding zone; the first guide tube protects the at least one of the first optical fiber or the first wire during the welding of the seam; and the first guide tube is not part of the armored cable after the making of the armored cable; and supporting the first guide tube within the armor tubing by a plurality of support legs such that the first guide tube does not contact the armor tubing.

20 Claims, 11 Drawing Sheets

(56) References Cited

U.S. PATENT DOCUMENTS

| | | |
|---|---|---|
| 5,072,870 A | 12/1991 | Ziemek |
| 5,143,274 A | 9/1992 | Laupretre et al. |
| 5,318,215 A | 6/1994 | Toya et al. |
| 5,418,877 A | 5/1995 | Destreich |
| 5,467,420 A | 11/1995 | Rohrmann et al. |
| 5,621,841 A | 4/1997 | Field |
| 5,653,898 A | 8/1997 | Yoshie et al. |
| 5,815,908 A | 10/1998 | Wichmann |
| 5,857,255 A | 1/1999 | Wichmann |
| 6,047,586 A | 4/2000 | Hannen |
| 6,223,407 B1 | 5/2001 | Staschewski et al. |
| 6,423,389 B1 | 7/2002 | Yoshie |
| 6,522,815 B1 | 2/2003 | Staschewski |
| 6,697,556 B1 | 2/2004 | Militaru et al. |
| 7,024,081 B2 | 4/2006 | Dowd et al. |
| 7,447,406 B2 | 11/2008 | Sutehall et al. |
| 7,599,590 B2 | 10/2009 | Stocklein et al. |
| 7,646,953 B2 | 1/2010 | Dowd et al. |
| 8,929,701 B2 | 1/2015 | Lowell et al. |
| 10,173,286 B2 | 1/2019 | Dowd et al. |
| 2013/0098528 A1 | 4/2013 | Dowd et al. |

OTHER PUBLICATIONS

Gulf Cooperation Council Examination Report dated Nov. 2, 2021, corresponding to Application No. GC 2019-37945.
Search Report issued to Application No. 2021103007 dated Jul. 16, 2021.
First Office Action in counterpart Chinese Appl. 201980048322.4 dated Sep. 29, 2023, 25-pgs.

CABLE TO REDUCE OPTICAL FIBER MOVEMENT AND METHODS TO FABRICATE

CROSS-REFERENCE TO RELATED APPLICATIONS

This is a divisional of U.S. application Ser. No. 16/511,190, filed Jul. 15, 2019, which claims the benefit of U.S. Provisional Patent Application Ser. No. 62/701,157, filed Jul. 20, 2018, which are both incorporated herein by reference in their entireties.

BACKGROUND

Field

Aspects of the present disclosure generally relate to an armored cable having one or more optical fibers contained therein. More particularly, aspects of the present disclosure relate to a fiber optic cable having an armored tube and one or more optical fibers adhered to an inner wall of the armored tube and techniques for fabricating such a cable.

Description of the Related Art

In the last few decades, the deployment of optical fibers has exploded, not only for the transmission of information, but also for measuring various physical parameters. By its intrinsic nature, the optical fiber can serve as a distributed sensor through its scattering characteristics. For example, Rayleigh scattering has been used for monitoring optical power along the fiber path, Raman scattering has been used to measure the temperature profile along the fiber, and Brillouin scattering has been used to measure the fiber strain profile. In addition, an optical fiber's local optical properties can be modified to reflect signals dependent on local physical parameters. For example, fiber Bragg gratings (FBGs) reflect optical signals centered at varying wavelengths according to the local fiber temperature and/or strain.

In the last couple of decades, optical fibers have been increasingly used to monitor oil and gas wells. The small diameter and long reach of fibers are ideal for insertion in such wells and do not obstruct the wells significantly to alter their primary function as fluid conduits. In addition, since optical fibers are made of glass, the fibers may remain inert even in the high temperature and pressure conditions downhole, which are too harsh for most materials. One drawback of optical fibers is their fragility against mechanical scratching and crushing; consequently, optical fibers are typically embedded in a mechanically protective layer to form an optical fiber cable. Tubes composed of corrosion-resistant alloys are the mechanical protective layer generally used in oil and gas wells, for optical fibers transmitting optical signals between the surface and individual point optical sensors downhole.

SUMMARY

Certain aspects of the present disclosure generally relate to an armored cable with optical fibers attached to an inner wall therein and methods for producing the same. The fiber optic cable with optical fibers attached to an inner wall therein may prevent the optical fibers from shifting axially.

Certain aspects of the present disclosure provide a method for making an armored cable. The method generally includes applying an adhesive material to a strip stock; forming the strip stock with the adhesive material into an armor tubing; welding a seam of the armor tubing in a welding zone; and inserting at least one of a first optical fiber or a first wire into a first end of a first guide tube, wherein: the first guide tube extends through the welding zone; the first guide tube protects the at least one of the first optical fiber or the first wire during the welding of the seam; the at least one of the first optical fiber or the first wire contacts the adhesive material after the at least one of the first optical fiber or the first wire exits a second end of the first guide tube; and the first guide tube is not part of the armored cable after the making of the armored cable.

Certain aspects of the present disclosure provide a method for making an armored cable. The method generally includes forming a strip stock into an armor tubing; welding a seam of the armor tubing in a welding zone; inserting at least one of a first optical fiber or a first wire into a first end of a first guide tube, wherein: the first guide tube extends through the welding zone; the first guide tube protects the at least one of the first optical fiber or the first wire during the welding of the seam; and the first guide tube is not part of the armored cable after the making of the armored cable; and supporting the first guide tube within the armor tubing by a plurality of support legs such that the first guide tube does not contact the armor tubing.

Certain aspects of the present disclosure provide a method for making an armored cable. The method generally includes forming a strip stock into an armor tubing; welding a seam of the armor tubing in a welding zone; applying an adhesive material to a welded portion of the armor tubing outside of the welding zone, wherein the adhesive material comprises a mixture of a first material and a second material and wherein applying the adhesive material to the armor tubing comprises: introducing the first material via a first injection tube that extends through the welding zone; introducing the second material via a second injection tube that extends through the welding zone; mixing the first material and the second material to form the mixture; and applying the mixture of the first material and the second material to an inner surface of the armor tubing; and inserting at least one of a first optical fiber or a first wire into a first end of a first guide tube, wherein: the first guide tube extends through the welding zone; the first guide tube protects the at least one of the first optical fiber or the first wire during the welding of the seam; the at least one of the first optical fiber or the first wire contacts the mixture after the at least one of the first optical fiber or the first wire exits a second end of the first guide tube; and the first guide tube is not part of the armored cable after the making of the armored cable.

BRIEF DESCRIPTION OF THE DRAWINGS

So that the manner in which the above recited features of the present disclosure can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Certain aspects of the present disclosure provide armored fiber optic cables having an armor tube and one or more optical fibers attached to an inner wall of the armor tube, as well as techniques for making these cables. Such fiber optic cables may be capable of deployment in oil and gas wells, for example, for monitoring of the wells.

Example Armored Cable Fabrication

Downhole optical fiber cables may be manufactured using an outer armor tubing for protection of one or more optical fibers and/or wires contained therein. To form the armor tubing, flat tube strip stock may be fed to a tube-forming stage, which gradually rolls up the sides of the tube strip stock into a tube as the tube strip stock moves through the process at a particular feed rate. The seam in the nearly completed tube is then welded in a welding zone to form a seam-welded armor tubing. After welding, the armor tubing may be further formed with rollers or a sizing die, for example, to produce a desired finished diameter for the armor tubing (e.g., ¼ diameter).

Protection of the optical fibers and/or wires from the armor tubing welding process may be provided by using guide tubes. The guide tubes may be fixed in position in the welding zone, at or near the welding point. The guide tube's fiber or wire entrance (i.e., inlet) may be located (just) before or in the armor tube's tube-forming stage. The guide tube's fiber or wire exit (i.e., outlet) may be disposed inside the welded armor tube, beyond a point at which heat from welding would damage the fibers and/or wires and, in some cases, beyond the final size-forming process of the tube.

It is often desirable to have some amount of excess fiber length (EFL) in the armored cable, for example, to reduce strain on the optical fibers. EFL generally refers to an excess length of the fiber relative to the armor tubing. The amount of EFL in the finished armored cable may be controlled by the ratio of the fiber pushing speed to the armor tubing welding line speed (e.g., the ratio of these feed rates generally determines the amount of EFL). The optical fiber may be pushed through the guide tube with a fiber feed device, which is a mechanism that can feed the fiber from a fiber source at a controlled rate. The EFL can then be managed by controlling the fiber's feed rate as compared to the armor tubing welding line speed (i.e., the tube rate). In some cases, the optical fiber(s) may be put into an armor tubing after the armor tubing is manufactured by pushing fiber into the armor tubing with the aid of gas or liquids.

Figure 1:
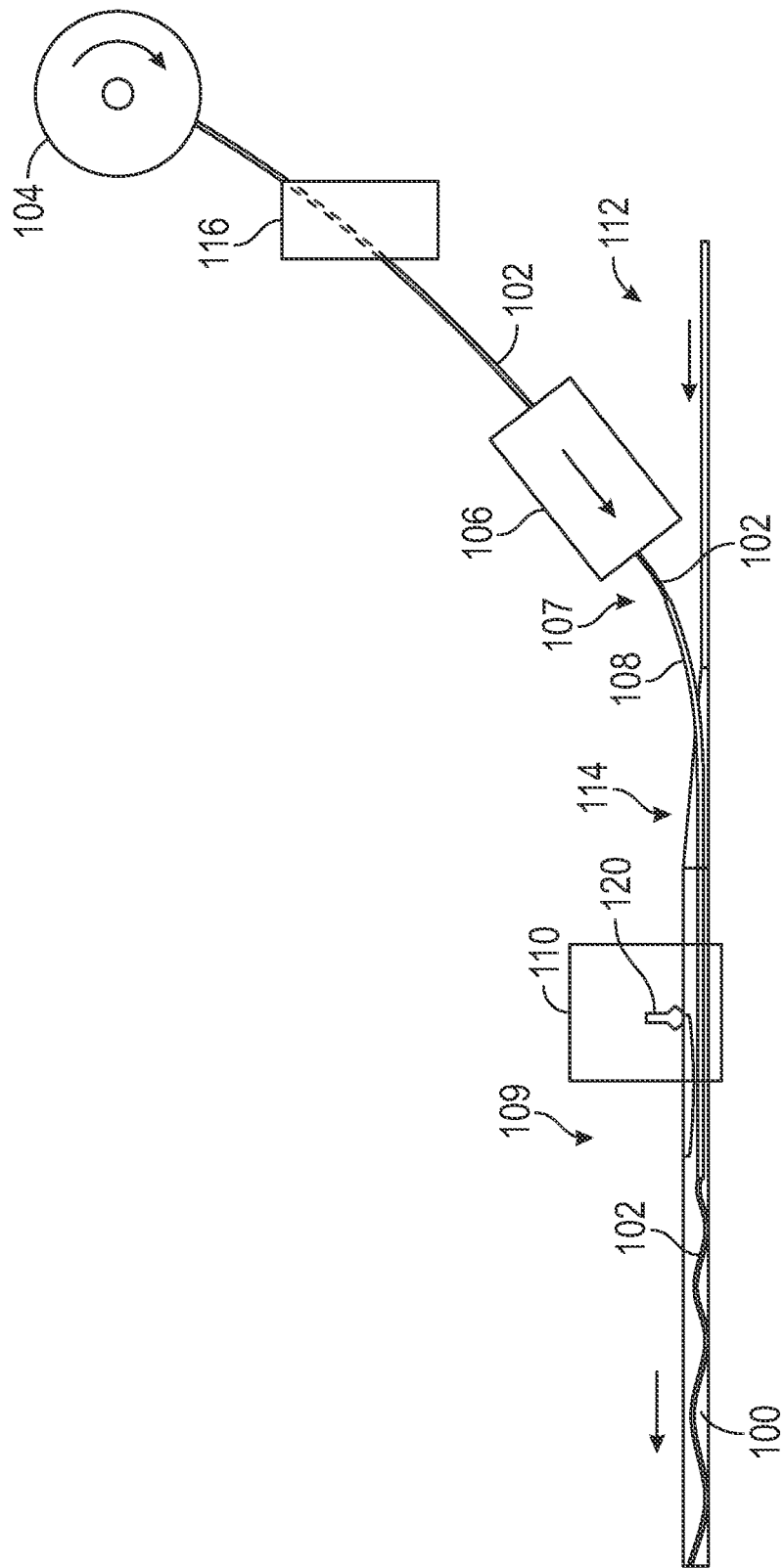
FIG. 1 illustrates a previously-known technique of making an armored cable.

FIG. 1 illustrates fabrication of an armored cable, in accordance with previously known techniques. The armored cable comprises an armor tubing 100 and one or more optical fibers and/or wires 102 (only one optical fiber or wire is illustrated in FIG. 1 for simplicity). To form the armor tubing 100, flat tube strip stock at 112 may be fed to a tube-forming stage 114, which gradually rolls up the sides of the tube strip stock into a tube as the tube strip stock moves through the process at a particular tube rate. The seam (which may be a ¼ in. seam) in the nearly completed tube is then welded in the welding zone 110 by a welder 120 (e.g., an arc welder or a welding torch) to form a completed, seam-welded armor tubing.

Protection of the fibers and/or wires 102 from the armor tubing welding process may be provided by using guide tubes 108. The guide tubes 108 may be made of metal, ceramic, or any of various other suitable heat-resistant materials. The guide tubes 108 may be fixed in position in the welding zone 110, at or near the welding point. The guide tube's fiber entrance (i.e., inlet) 107 may be located (just) before or in the armor tubing's tube forming stage 114. The guide tube's exit 109 (i.e., outlet) may be disposed inside the welded armor tubing, beyond a point at which heat from welding would damage the fibers.

The amount of EFL in the finished armored cable may be controlled by the ratio of the fiber pushing speed to the armor tubing welding line speed (e.g., the ratio of these feed rates generally determines the amount of EFL). The fiber is pushed through the guide tube 108 with a fiber feed device 106, a mechanism that can feed the fiber from a fiber source 104 at a controlled rate. The EFL can then be managed by controlling the fiber's feed rate as compared to the armor tubing welding line speed (i.e., the tube rate).

Example Fiber Optic Cable

Figure 2:
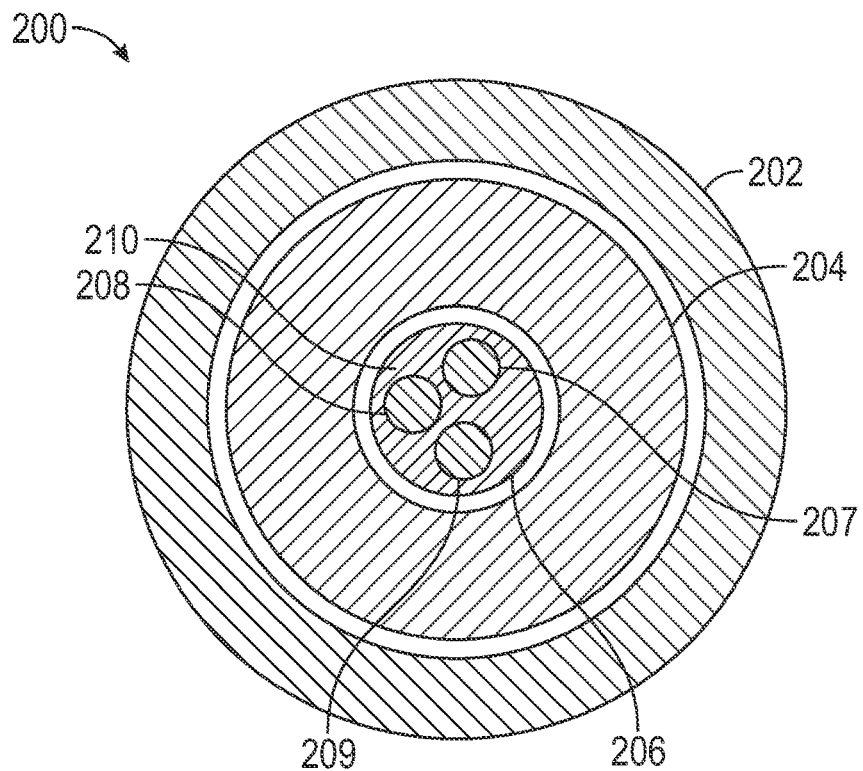
FIG. 2 is a cross-sectional view of an example fiber optic cable, in accordance with the prior art.

FIG. 2 illustrates an example conventional fiber optic cable 200 design. The example conventional fiber optic cable 200 has a small-diameter inner tube 206 that may contain optical fibers and/or wires 207, 208, and 209 along with a gel material 210. The nature of the small-diameter tube and gel prevents the optical fibers and/or wires from shifting. The small-diameter tube is surrounded by a buffer material 204 to hold the small-diameter tube centralized within the outer armor tube 202. This design containing an inner tube and buffer is typical of previous designs. To isolate fiber Bragg gratings (FBGs) within a cable, elaborate and costly methods of construction have been developed that include cutting the cable to insert FBGs and then splicing the cable segments together.

Example Cable to Reduce Optical Fiber Movement

In order to reduce the cost of optical fiber cables used for downhole oil and gas sensing, cables may be manufactured with minimal components. Some cable designs include only an outer armor tube with optical fibers enclosed (e.g., small diameter fibers having a cladding with a typical diameter of 125 μm). The optical fibers, if not supported, may shift axially within the armor tube, especially when the tube is vertical. The optical fiber may then be compressed in areas, causing optical loss and possible fracture failure from bending. Another problem that may be created by an axial shift of the optical fiber is an inability to isolate FBGs from strain within the cable, despite the presence of EFL in the cable.

Certain aspects of the present disclosure provide an armored cable having one or more optical fibers and/or wires adhered to an inner wall of the armored cable. The armored cable having one or more optical fibers and/or wires adhered to an inner wall of the armored cable may help overcome difficulties caused by optical fibers and/or wires shifting longitudinally, due to the weight of the optical fibers and/or wires when the armored cable is deployed downhole.

Figure 3:
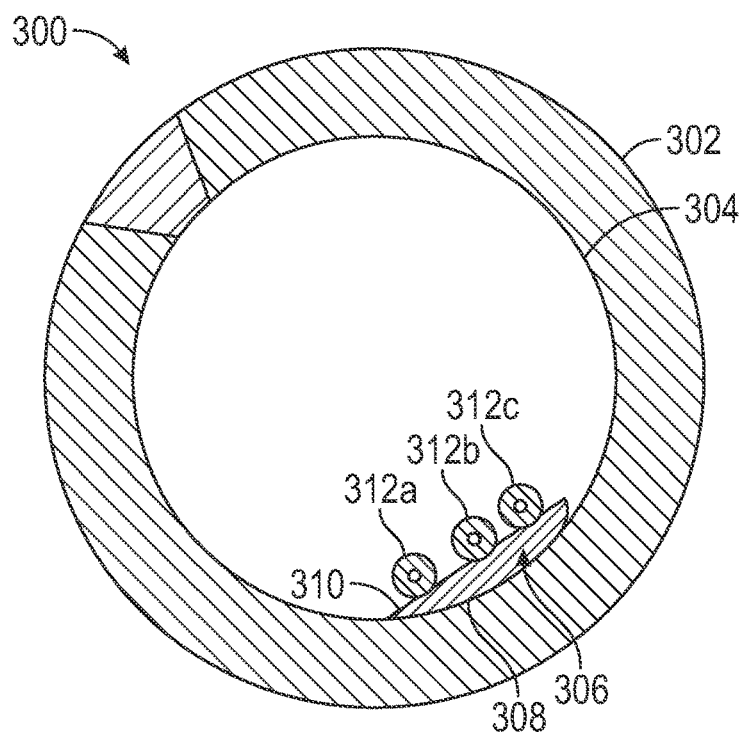
FIG. 3 is a cross-sectional view of an example fiber optic cable with an adhesive material attached to an inner wall of the armor tubing, in accordance with certain aspects of the present disclosure.

FIG. 3 is a cross-sectional view of an example fiber optic cable 300 with an adhesive material 306 attached to an inner wall of the armor tubing, according to certain aspects of the present disclosure. In the fiber optic cable 300, an armor tubing 302 may have one or more optical fibers and/or wires 312 attached to an inner wall 304 of the armor tubing 302.

According to aspects of the present disclosure, the armor tubing 302 may be composed of a metal.

In aspects of the present disclosure, one or more strips of adhesive material 306 may be used to attach the one or more optical fibers and/or wires 312 to the inner wall 304 of the armor tubing 302. The adhesive material 306 may be applied within the armor tubing 302 either just beyond where the armor tubing is welded or on the tube strip stock before or during the tube-forming and welding process. The optical fibers and/or wires may or may not be continuously adhered to the inner wall of the armor tubing. For example, if an armored cable includes EFL, then the optical fibers will be fed into the tubing at a faster rate than the armor tubing is moving through the welding line, possibly resulting in the optical fibers randomly, periodically, or intermittently contacting the adhesive material.

The adhesive material 306 may comprise, for example, a sticky, tacky, or gel-like substance, such as silicone, or any of various other suitable materials for attaching an optical fiber or wire to an inner wall 304 of the armor tubing 302. The adhesive material may not necessarily create a permanent bond with the inner wall 304, but may allow the optical fiber(s) and/or wire(s) to release if a force greater than the weight of the fiber(s) and/or wire(s) is applied.

According to aspects of the present disclosure, each of the one or more strips of adhesive material 306 has a first side 308 and a second side 310. As illustrated in FIG. 3, the first side 308 may be attached to the inner wall 304 of the armor tubing 302, and the second side 310 may be attached to one or more of the optical fibers and/or wires 312. For other aspects, the adhesive material may have a cross-section with more or less than four sides. That is, the adhesive material may have, for example, a triangular cross-section or a hexagonal cross-section. For certain aspects, the adhesive material may have no discernable sides. For example, the adhesive material may be circular or elliptical in cross-section or have a cross-section similar to a sector or segment of a circle (e.g., semicircular).

Figure 4:
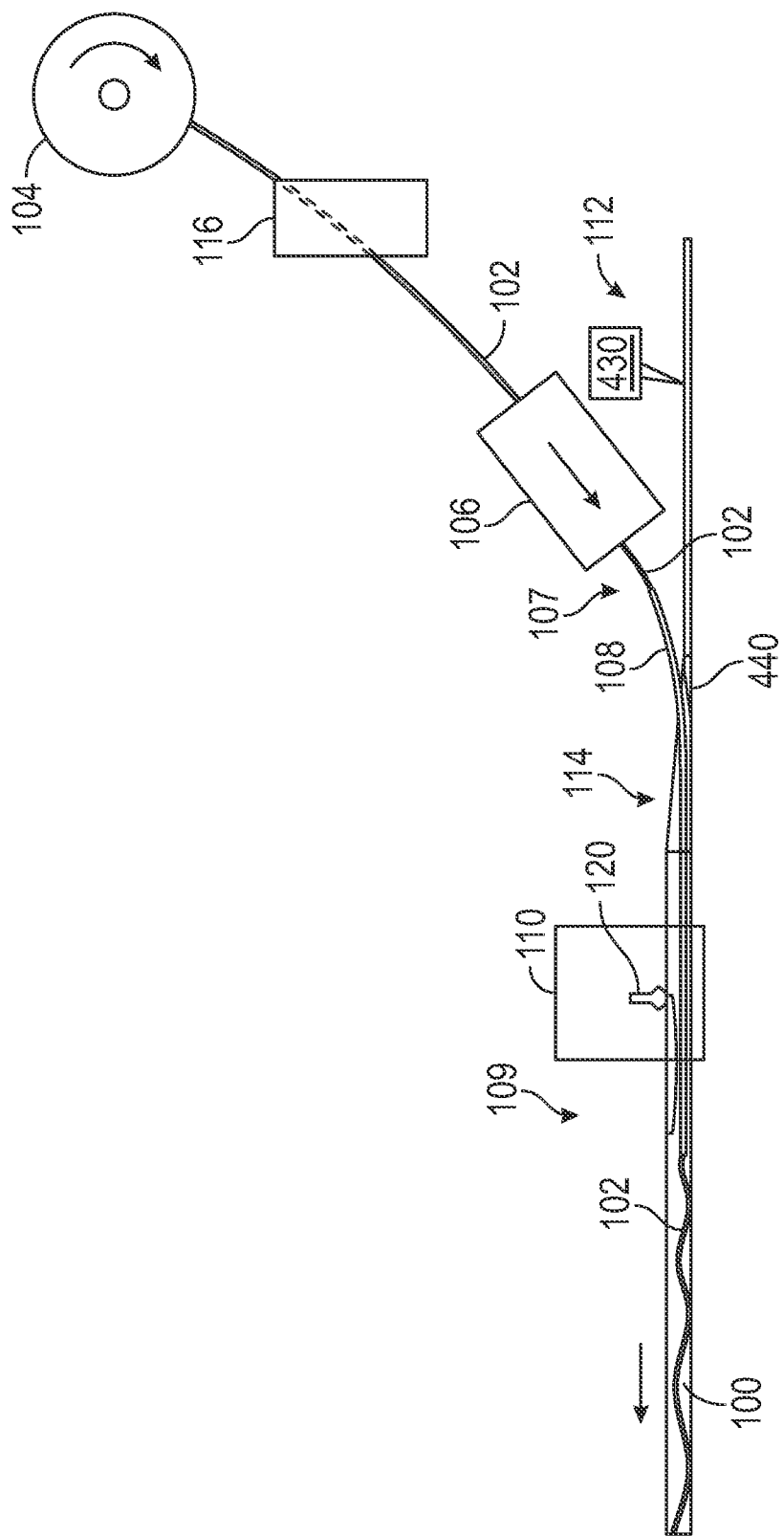
FIG. 4 illustrates fabrication of an armored cable, in accordance with certain aspects of the present disclosure.

FIG. 4 illustrates fabrication of an armored cable, in accordance with certain aspects of the present disclosure. The fabrication and armored cable illustrated in FIG. 4 are similar to the fabrication and armored cable illustrated in FIG. 1, and items previously described in the description of FIG. 1 are not further described. The armored cable comprises an armor tubing 100, one or more optical fibers and/or wires 102 (only one optical fiber is illustrated in FIG. 4 for simplicity), and adhesive material 440. The adhesive material 440 may be applied to the tube strip stock 112 by an adhesive applicator 430. The adhesive material 440 may be implemented as a continuous strip, as illustrated. Alternatively, the adhesive material 440 may be implemented as a plurality of discontinuous strips or a plurality of discrete quantities (e.g., beads, droplets, or dollops). The exit 109 of the guide tube 108 may be configured to allow the optical fibers and/or wires 102 to contact the adhesive material 440 (e.g., via gravity) after the optical fibers or wires exit the guide tube. For certain aspects, the exit 109 of the guide tube 108 may be configured to direct the optical fibers and/or wires 102 toward the adhesive material 440 after the optical fibers or wires exit the guide tube.

Figure 5A:
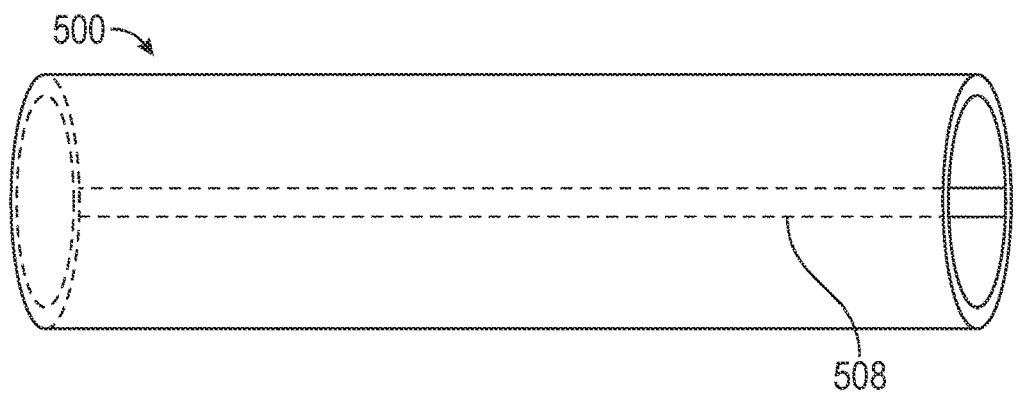
FIG. 5A illustrates an example fiber optic cable with an adhesive material attached to the inner wall of the armor tubing as a continuous strip, in accordance with certain aspects of the present disclosure.

FIG. 5A illustrates an example fiber optic cable 500 wherein at least one of the strips of adhesive may be a continuous strip 508 of adhesive material, according to certain aspects of the present disclosure.

Figure 5B:
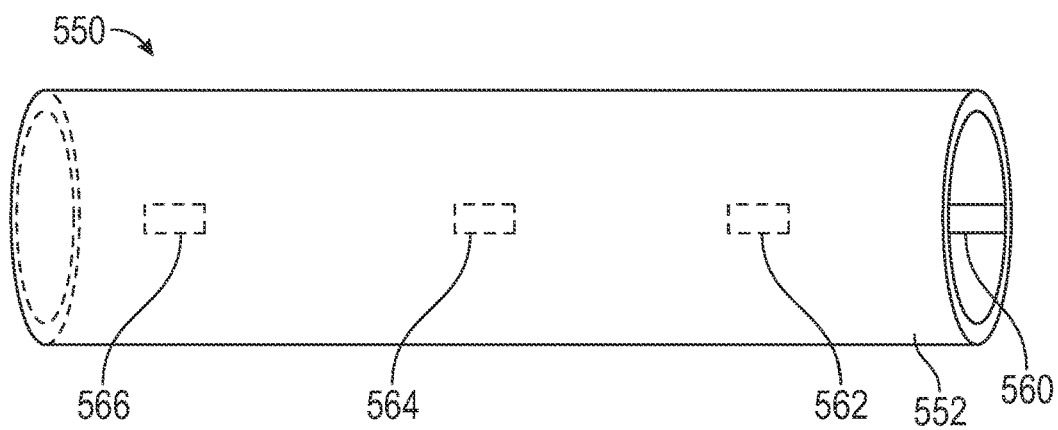
FIG. 5B illustrates an example fiber optic cable with an adhesive material attached to the inner wall of the armor tubing as an intermittent strip, in accordance with certain aspects of the present disclosure.

FIG. 5B illustrates an example fiber optic cable 550 wherein a plurality of strips 560, 562, 564, and 566 of adhesive material may be arranged intermittently within an armor tubing 552, according to certain aspects of the present disclosure.

In aspects of the present disclosure, an intermittent strip of adhesive material may comprise a continuous strip having a plurality of adhesive sections interspersed with a plurality of sections that have no adhesive materials (e.g., blank sections with no material or non-adhesive material).

According to certain aspects of the present disclosure, one or more of the strips of adhesive material for attaching the one or more optical fibers and/or wires to the inner wall of the armor tube may be a hard-curing material. For certain aspects, the hard-curing material may be an epoxy.

In aspects of the present disclosure, the armor tubing has a central longitudinal axis, and the one or more optical fibers and/or wires are disposed radially away from the central longitudinal axis.

According to certain aspects of the present disclosure, no other tube is disposed in the armor tubing along the entire length of the fiber optic cable. For other aspects, no other tube is disposed in the armor tubing along at least a portion of the length of the fiber optic cable.

According to certain aspects of the present disclosure, a fluid may be disposed inside the armor tubing. In certain aspects, the fluid may be a gas. For example, the gas may be air or argon (e.g., introduced by the welding process). For other aspects, the fluid may be a gel. For example, the gel may include conventional thixotropic gels, grease compounds, and/or foams commonly used in the fiber optic cable industry for water blocking, hydrogen scavenging, and/or filling.

Figure 6A:
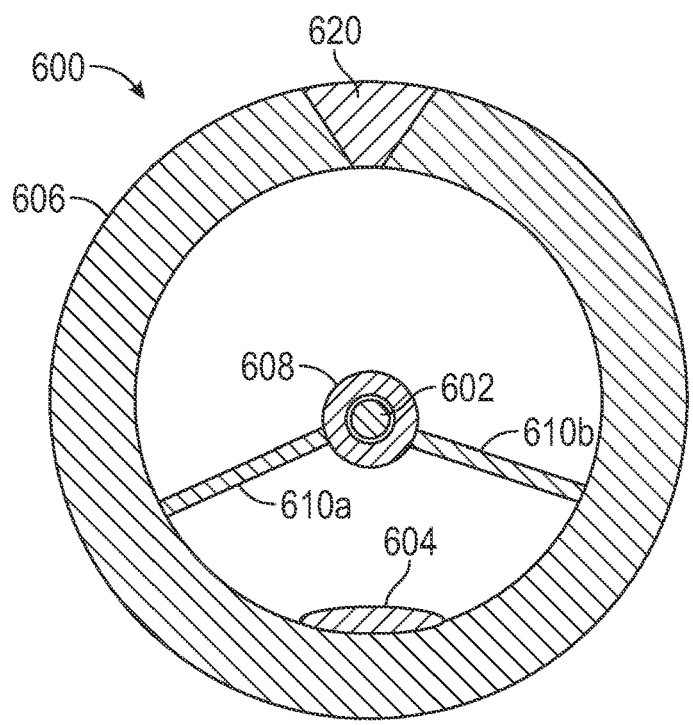
FIG. 6A is a cross-sectional view of fabrication of an example armored cable, in accordance with certain aspects of the present disclosure.

FIG. 6A is a cross-sectional view of fabrication of an example armored cable 600, according to certain aspects of the present disclosure. The armored cable 600 is shown in a welding zone (e.g., welding zone 110, shown in FIG. 1) of a fabrication process. The armored cable 600 comprises armor tubing 606, adhesive material 604, and an optical fiber or wire 602. Seam-welding of the armor tubing is represented at weld 620. The optical fiber or wire 602 is protected (e.g., from heat associated with welding) by a guide tube 608, which may be an example of the guide tube 108 (shown in FIG. 1), in accordance with aspects of the present disclosure. According to aspects of the present disclosure, the guide tube 608 may be supported by a plurality of legs 610 so as to prevent the guide tube 608 from contacting the adhesive material 604. The legs 610 may be attached to the guide tube 608, as described in more detail below with reference to FIGS. 6B and 6C. The legs 610 may be curved or the ends (or end portions) of the legs may have a coating (e.g., a lubricant, such as graphite), to aid with sliding of the armor tubing and to prevent scratching or other damage to an inner surface of the armor tubing.

Figure 6B:
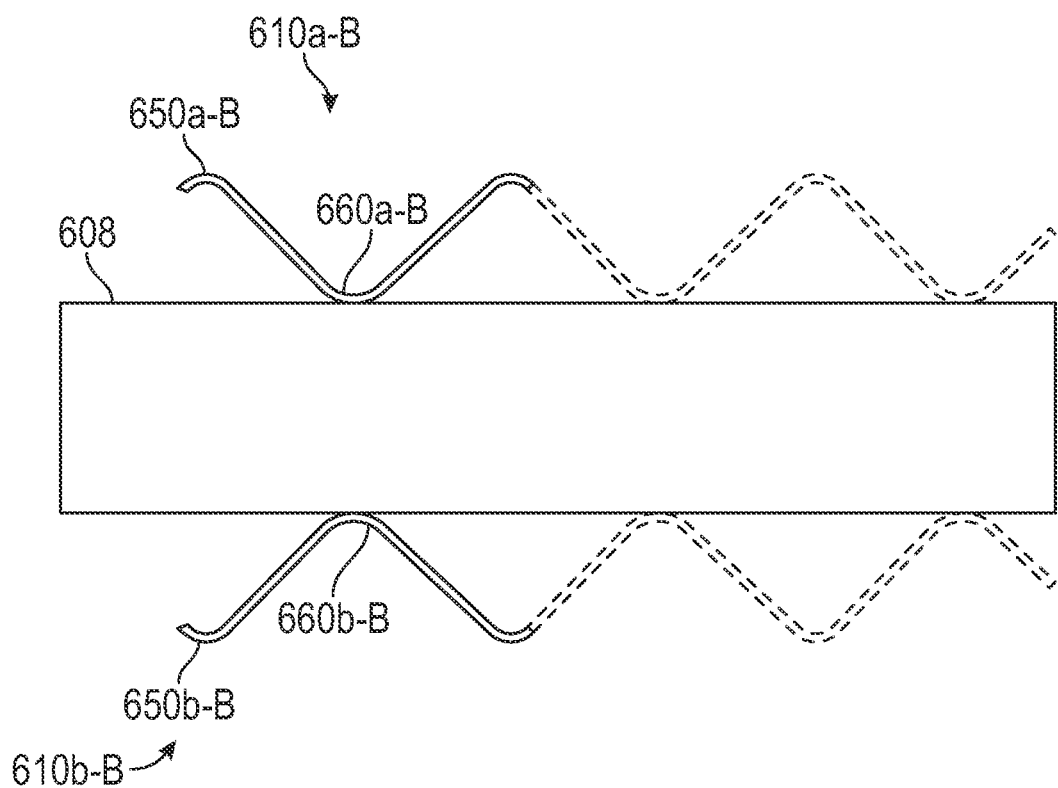
FIGS. 6B and 6C illustrate overhead views of exemplary guide tubes and legs, in accordance with certain aspects of the present disclosure.

FIG. 6B illustrates an overhead view of an exemplary guide tube 608 and legs 610, according to aspects of the present disclosure. As illustrated, each of the legs 610a-B and 610b-B includes a middle portion 660a-B or 660b-B that is attached (e.g., welded) to the guide tube 608 and an end portion 650a-B or 650b-B that may contact the armor tubing (see FIG. 6A) to support the guide tube 608 and prevent the guide tube 608 from contacting the adhesive material (see FIG. 6A). The legs 610 may optionally, as represented by the dashed lines, comprise a plurality of middle portions that are attached to the guide tube and other portions that contact the armor tubing.

Figure 6C:
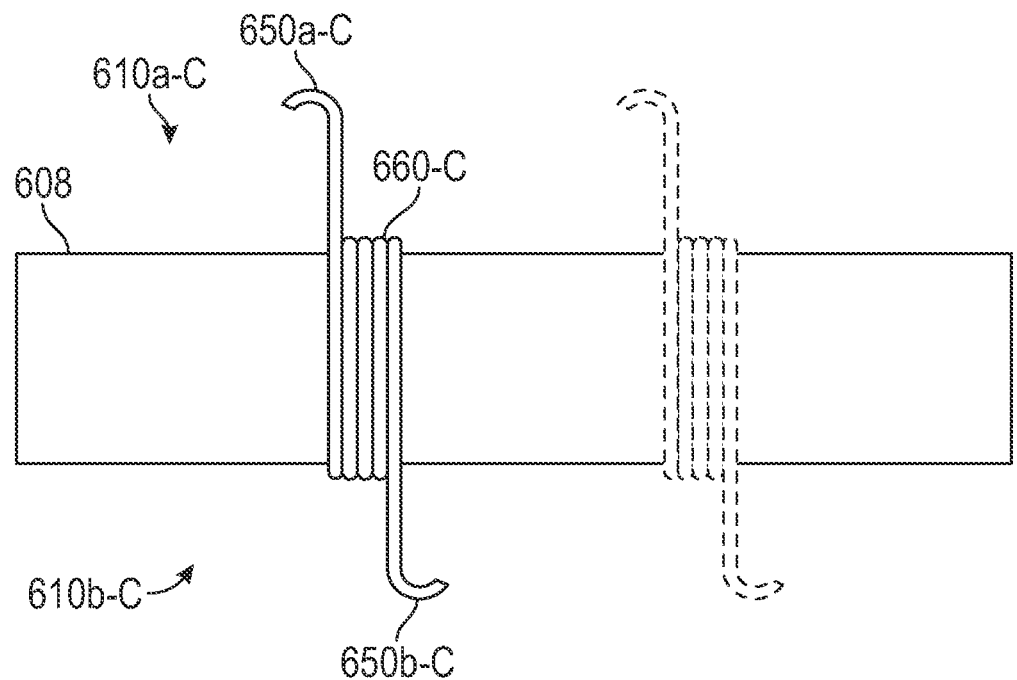

FIG. 6C illustrates an overhead view of an exemplary guide tube 608 and legs 610, according to aspects of the present disclosure. As illustrated, each of the legs 610a-C and 610b-C is formed from an end portion 650a-C or 650b-C that extends from a middle portion 660-C that is wrapped around the guide tube 608. This design may be similar to a hose clamp. The end portions 650a-C and 650b-C may contact the armor tubing (see FIG. 6A) to support the guide tube 608 and prevent the guide tube 608 from contacting the adhesive material (see FIG. 6A). The middle portion 660-C may optionally be attached (e.g., welded or soldered) to the guide tube 608. Optionally, as represented by the dashed lines, a plurality of legs 610 may support the guide tube 608 and contact the armor tubing.

Figure 7A:
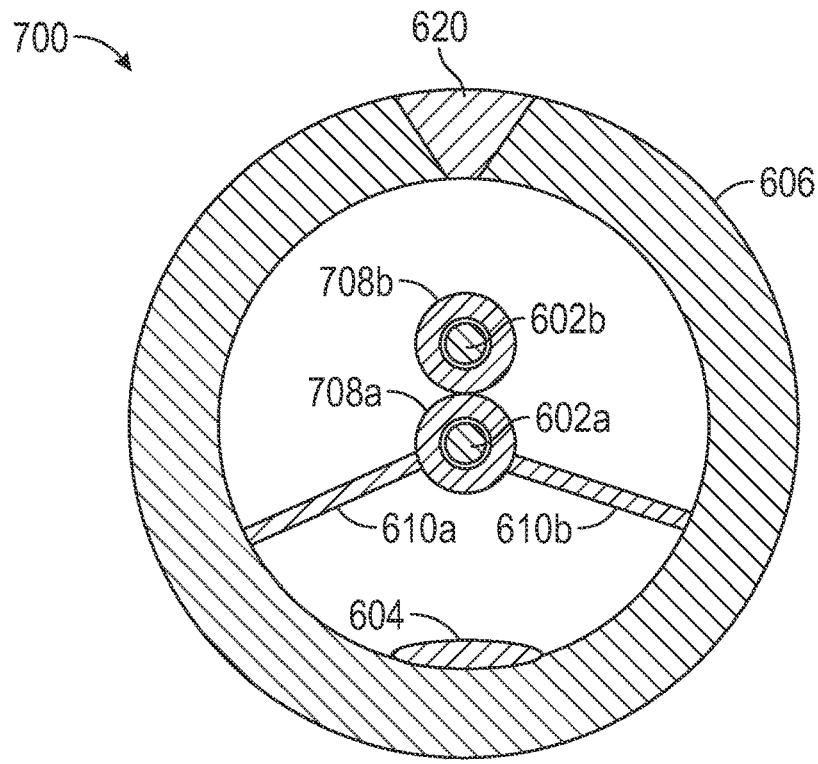
FIGS. 7A and 7B illustrate cross-sectional views of fabrication of example armored cables each having two optical fibers or wires, in accordance with certain aspects of the present disclosure.

FIG. 7A is a cross-sectional view of fabrication of an example armored cable 700, according to certain aspects of the present disclosure. The armored cable 700 is shown in a welding zone (e.g., welding zone 110, shown in FIG. 1) of a fabrication process. The armored cable 700 comprises armor tubing 606, adhesive material 604, a first optical fiber or wire 602a, and a second optical fiber or wire 602b. Seam-welding of the armor tubing is represented by weld 620. The optical fibers or wires 602 are protected (e.g., from heat associated with welding) by a first guide tube 708a and a second guide tube 708b, which may be examples of the guide tube 108 (shown in FIG. 1), in accordance with aspects of the present disclosure. While the armored cable 700 is shown with two optical fibers or wires each protected by a guide tube, the present disclosure is not so limited, and additional optical fibers or wires may be protected by additional guide tubes. For other aspects, each guide tube may include more than one optical fiber or wire. According to aspects of the present disclosure, the first guide tube 708a may be supported by a plurality of legs 610 so as to prevent the guide tube 708a from contacting the adhesive material 604. The legs 610 may be attached to the guide tube 708a, as described in more detail above with reference to FIGS. 6B and 6C. The second guide tube 708b may be attached (e.g., welded) to the first guide tube 708a, such that the second guide tube 708b is supported by the first guide tube 708a and prevented from contacting the adhesive material 604.

Figure 7B:
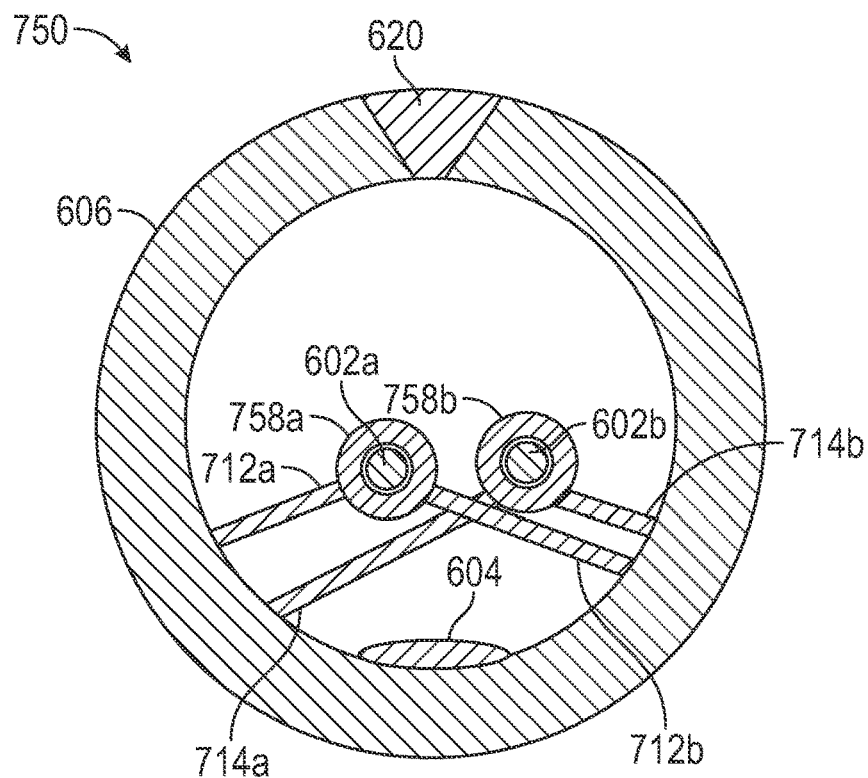

FIG. 7B is a cross-sectional view of fabrication of an example armored cable 750, according to certain aspects of the present disclosure. The armored cable 750 is shown in a welding zone (e.g., welding zone 110, shown in FIG. 1) of a fabrication process. The armored cable 750 comprises armor tubing 606, adhesive material 604, a first optical fiber or wire 602a, and a second optical fiber or wire 602b. Seam-welding of the armor tubing is represented by weld 620. The optical fibers or wires 602 are protected (e.g., from heat associated with welding) by a first guide tube 758a and a second guide tube 758b, which may be examples of the guide tube 108 (shown in FIG. 1), in accordance with aspects of the present disclosure. While the armored cable 700 is shown with two optical fibers or wires each protected by a guide tube, the present disclosure is not so limited, and additional optical fibers or wires may be protected by additional guide tubes. For other aspects, each guide tube may include more than one optical fiber or wire. According to aspects of the present disclosure, the first guide tube 758a may be supported by a plurality of legs 712 so as to prevent the guide tube 758a from contacting the adhesive material 604. The legs 712 may be attached to the guide tube 758a, as described in more detail above with reference to FIGS. 6B and 6C. The second guide tube 758b may also be supported by a plurality of legs 714 so as to prevent the guide tube 758a from contacting the adhesive material 604. The legs 714 may be attached to the guide tube 758b, as described in more detail above with reference to FIGS. 6B and 6C. For certain aspects, the legs 712 may be located at a different axial position than the legs 714 (i.e., legs 712 are offset from legs 714).

Figure 8A:
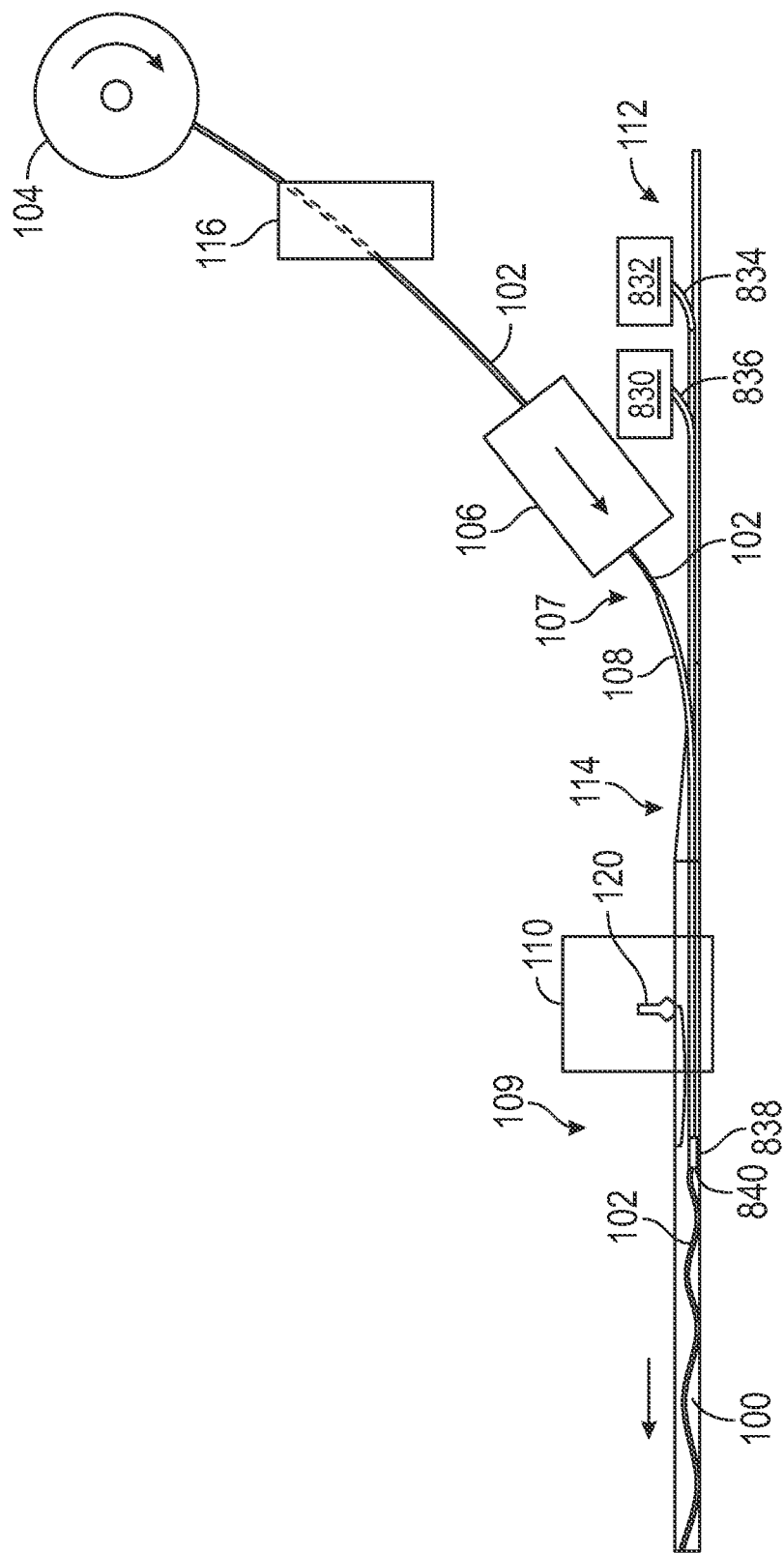
FIG. 8A illustrates fabrication of an armored cable with an adhesive material that is a mixture of two materials, in accordance with certain aspects of the present disclosure.

FIG. 8A illustrates fabrication of an armored cable, in accordance with aspects of the present disclosure. The fabrication and armored cable illustrated in FIG. 8A are similar to the fabrication and armored cable illustrated in FIG. 1, and items previously described in the description of FIG. 1 are not further described. The armored cable comprises an armor tubing 100, one or more optical fibers and/or wires 102 (only one optical fiber or wire is illustrated in FIG. 8A for simplicity), and adhesive material 840. The adhesive material 840 may be a mixture of a first material and a second material (e.g., two different materials). The first material may be supplied from a source 830 via a first injection tube 836 that extends through the welding zone 110. Similarly, the second material may be supplied from a source 832 via a second injection tube 834 that extends through the welding zone 110. The first material and the second material may be mixed after passing through the welding zone, and the mixture may be applied to an inner surface of the armor tubing 100. The adhesive material 840 (i.e., the mixture) may be a continuously applied liquid or gel, as illustrated. Alternatively, the adhesive material 840 may be applied as a plurality of discrete quantities (e.g., beads, droplets, or dollops) of the mixture. The first material and the second material may be optionally mixed in a static mixer 838, which may be attached to the first injection tube 834 and the second injection tube 836. The exit(s) 109 of the guide tube(s) may be configured to allow the optical fibers and/or wires 102 to contact the mixture after the optical fibers and/or wires exit the guide tube(s). For certain aspects, the exit(s) 109 of the guide tube(s) may be configured to direct the optical fibers and/or wires 102 toward the mixture after the optical fibers and/or wires exit the guide tube(s).

Figure 8B:
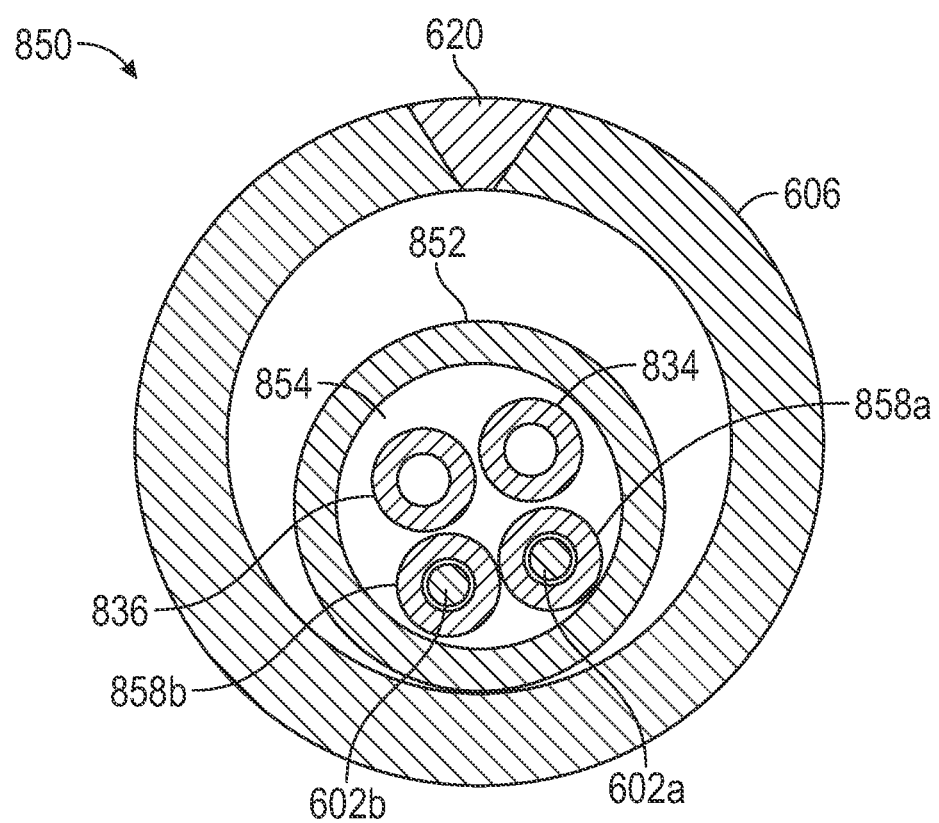
FIG. 8B is a cross-sectional view of fabrication of an example armored cable while using an outer guide tube, in accordance with certain aspects of the present disclosure.

FIG. 8B is a cross-sectional view of fabrication of an example armored cable 850, according to certain aspects of the present disclosure. The armored cable 850 is shown in a welding zone (e.g., welding zone 110, shown in FIG. 1) of a fabrication process. The armored cable 850 comprises armor tubing 606, adhesive material 840 (not shown, see FIG. 8A), and a plurality of optical fibers and/or wires 602. Seam-welding of the armor tubing is represented by weld 620. The optical fibers and/or wires 602 are each protected (e.g., from heat associated with welding) by a guide tube 858, which may be examples of the guide tube 108 (shown in FIG. 1), in accordance with aspects of the present disclosure. As illustrated, injection tubes 834 and 836 extend through the welding zone adjacent to the guide tubes 858. Although two guide tubes 858 are shown, the reader is to understand that more or fewer than two guide tubes may be used in the fabrication of the armored cable. According to aspects of the present disclosure, the guide tubes 858 and injection tubes 834 and 836 may be supported and contained by an outer guide tube 852. Alternatively, the outer guide tube 852 may not be present, and each of the guide tubes 858 and injection tubes 834 and 836 may be supported by the armor tubing 606. Space 854 within the outer guide tube may optionally allow for introduction of an inert and/or cooling gas during the fabrication process.

Figure 9:
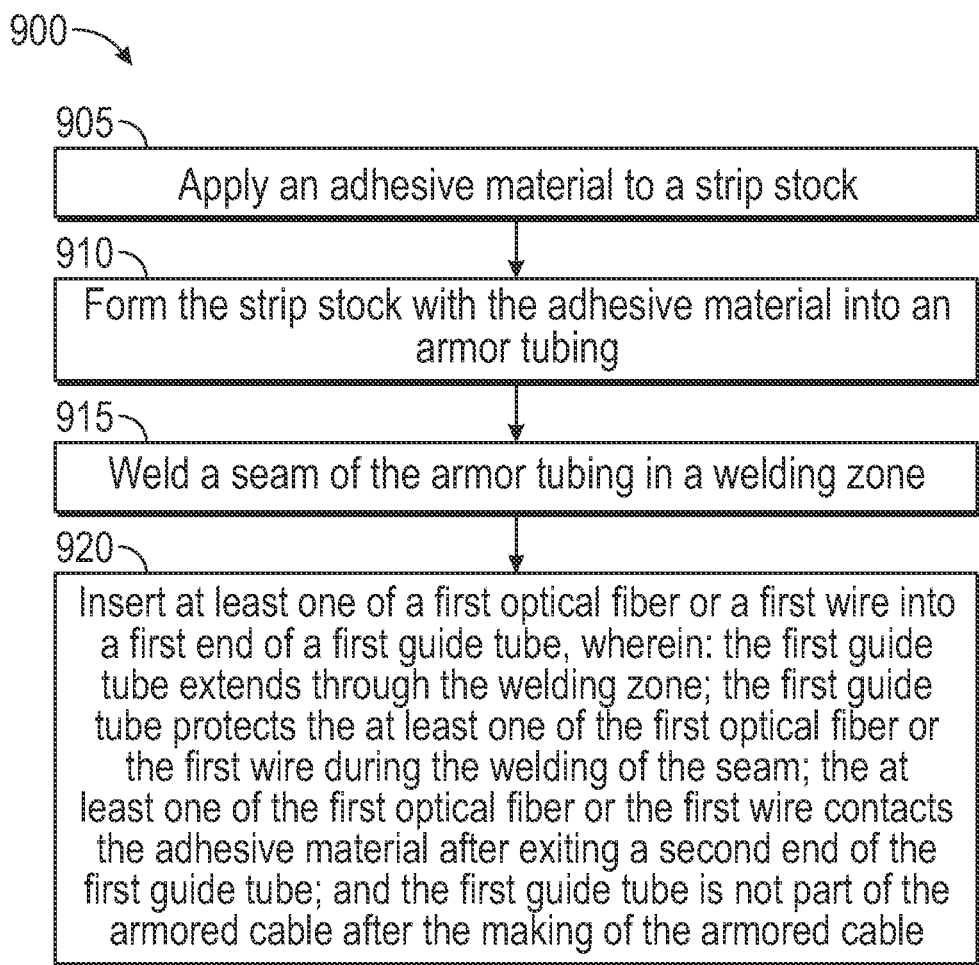
FIG. 9 is a flow diagram of example operations for making an armored cable while using an adhesive material, in accordance with certain aspects of the present disclosure.

FIG. 9 is a flow diagram of example operations 900 for making an armored cable, in accordance with aspects of the present disclosure. The operations 900 may begin, at block 905, by applying an adhesive material to a strip stock.

At block 910, operations 900 continue with forming the strip stock with the adhesive material into an armor tubing.

Operations 900 continue at block 915 with welding a seam of the armor tubing in a welding zone.

At block 920, operations 900 continue with inserting at least one of a first optical fiber or a first wire into a first end of a first guide tube, wherein: the first guide tube extends through the welding zone; the first guide tube protects the at least one of the first optical fiber or the first wire during the welding of the seam; the at least one of the first optical fiber or the first wire contacts the adhesive material after exiting a second end of the first guide tube; and the first guide tube is not part of the armored cable after the making of the armored cable.

According to certain aspects of the present disclosure, applying the adhesive material at block 905 includes applying a strip of the adhesive material to the strip stock.

In certain aspects of the present disclosure, applying the adhesive material at block 905 includes applying discrete quantities of the adhesive material to the strip stock.

According to certain aspects of the present disclosure, operations 900 may further include supporting the first guide tube within the armor tubing such that the first guide tube does not contact the armor tubing. Supporting the first guide tube comprises preventing the first guide tube from contacting the adhesive material in certain aspects of the present disclosure. A second end of the first guide tube may supported by a plurality of support legs, in certain aspects. A middle portion of a support wire may be attached to the first guide tube and at least one end portion of the support wire may be one of the plurality of support legs, in certain aspects. A support wire may extend axially along the first guide tube, a plurality of first portions of the support wire may be attached to the first guide tube, and a plurality of second portions of the support wire may be spaced from the first guide tube and may each form one of the plurality of support legs, in certain aspects. According to certain aspects of the present disclosure, a middle portion of a support wire may be wrapped around the first guide tube and at least one end portion of the support wire may be one of the plurality of support legs.

In certain aspects of the present disclosure, the first guide tube may be disposed within an outer guide tube. According to certain aspects of the present disclosure, operations 900 may further include introducing a gas within the outer guide tube.

According to certain aspects of the present disclosure, operations 900 may further include inserting at least one of a second optical fiber or a second wire into a first end of a second guide tube, wherein: the second guide tube extends through the welding zone; the second guide tube protects the at least one of the second optical fiber or the second wire during the welding; the at least one of the second optical fiber or the second wire contacts the adhesive material after exiting a second end of the second guide tube; and the second guide tube is not part of the armored cable after the making of the armored cable.

In certain aspects of the present disclosure, the adhesive material may adhere the at least one of the first optical fiber or the first wire to an interior surface of the armor tubing.

According to certain aspects of the present disclosure, the adhesive material may adhere a plurality of first portions of the at least one of the first optical fiber or the first wire to a plurality of locations on the interior surface of the armor tubing, and a plurality of second portions of the at least one of the first optical fiber or the first wire may not be adhered to the interior surface of the armor tubing.

Figure 10:
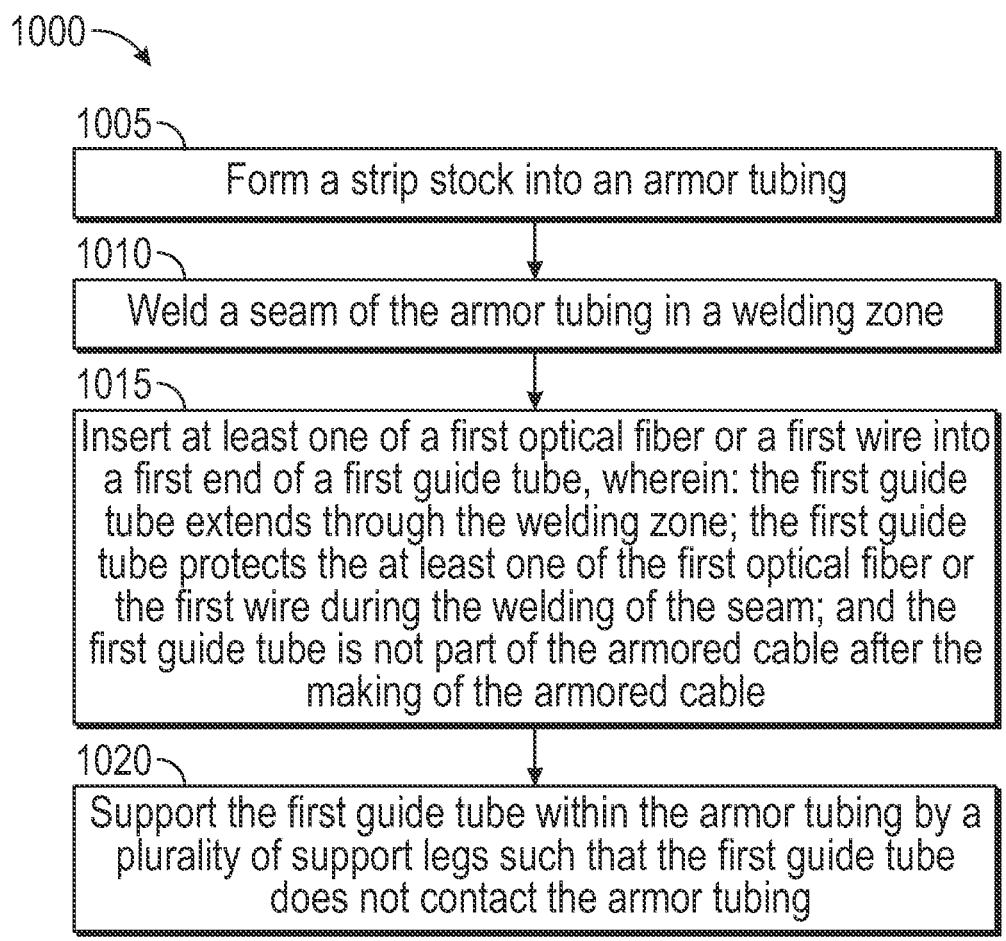
FIG. 10 is a flow diagram of example operations for making an armored cable while supporting a guide tube in armor tubing, in accordance with certain aspects of the present disclosure.

FIG. 10 is a flow diagram of example operations 1000 for making an armored cable, in accordance with aspects of the present disclosure. The operations 1000 may begin, at 1005, by forming a strip stock into an armor tubing.

At block 1010, operations 1000 continue with welding a seam of the armor tubing in a welding zone.

Operations 1000 continue at block 1015 with inserting at least one of a first optical fiber or a first wire into a first end of a first guide tube, wherein: the first guide tube extends through the welding zone; the first guide tube protects the at least one of the first optical fiber or the first wire during the welding of the seam; and the first guide tube is not part of the armored cable after the making of the armored cable.

At block 1020, operations 1000 continue with supporting the first guide tube within the armor tubing by a plurality of support legs such that the first guide tube does not contact the armor tubing.

According to certain aspects, operations 1000 may further include applying an adhesive material to an interior surface of the armor tubing, wherein the at least one of the first optical fiber or the first wire contacts the adhesive material after exiting a second end of the first guide tube. In aspects of the present disclosure, applying the adhesive material may include applying the adhesive material to a welded portion of the armor tubing outside of the welding zone. In aspects of the present disclosure, supporting the first guide tube comprises preventing the first guide tube from contacting the adhesive material. According to aspects of the present disclosure, the operations may also include inserting at least one of a second optical fiber or a second wire into a first end of a second guide tube, wherein: the second guide tube extends through the welding zone; the second guide tube protects the at least one of the second optical fiber or the second wire during the welding; the at least one of the second optical fiber or the second wire contacts the adhesive material after exiting a second end of the second guide tube; and the second guide tube is not part of the armored cable after the making of the armored cable.

In aspects of the present disclosure, a middle portion of a support wire may be attached to the first guide tube and at least one end portion of the support wire may be one of the plurality of support legs in operations 1000.

According to aspects of the present disclosure, a support wire may extend axially along the first guide tube, a plurality of first portions of the support wire may be attached to the first guide tube, and a plurality of second portions of the support wire may be spaced from the first guide tube and each form one of the plurality of support legs in operations 1000.

In aspects of the present disclosure, a middle portion of a support wire may be wrapped around the first guide tube and at least one end portion of the support wire may be one of the plurality of support legs in operations 1000.

According to aspects of the present disclosure, operations 1000 may further include inserting at least one of a second optical fiber or a second wire into a first end of a second guide tube, wherein: the second guide tube is disposed in the welding zone; the second guide tube protects the at least one of the second optical fiber or the second wire during the welding; and the second guide tube is not part of the armored cable after the making of the armored cable.

Figure 11:
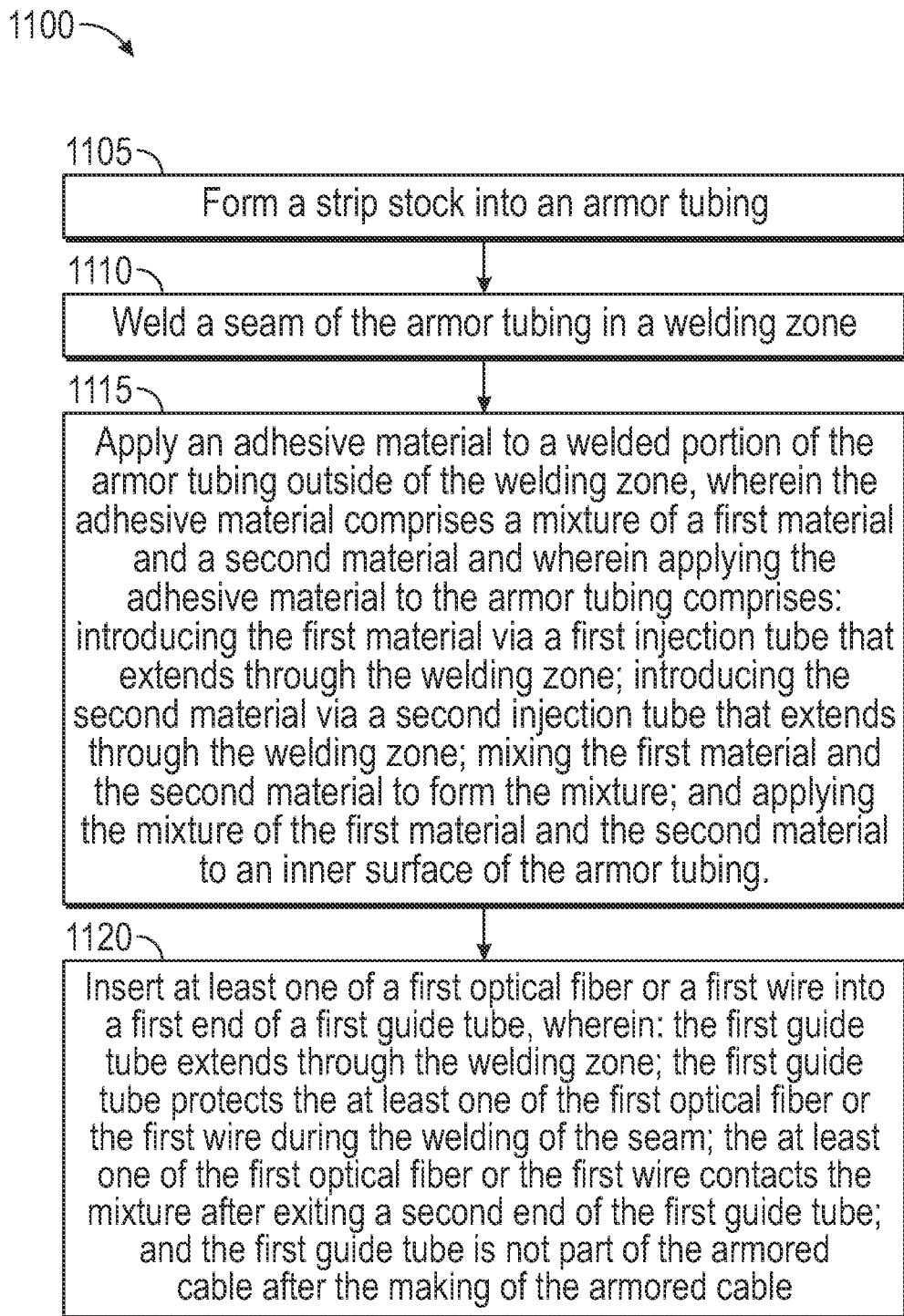
FIG. 11 is a flow diagram of example operations for making an armored cable with an adhesive material that is a mixture of two materials, in accordance with certain aspects of the present disclosure.

FIG. 11 is a flow diagram of example operations 1100 for making an armored cable, in accordance with certain aspects of the present disclosure. The operations 1100 may begin, at block 1105, by forming a strip stock into an armor tubing.

At block 1110, operations 1100 may continue with welding a seam of the armor tubing in a welding zone.

Operations 1100 may continue at block 1115 with applying an adhesive material to a welded portion of the armor tubing outside of the welding zone, wherein the adhesive material comprises a mixture of a first material and a second material and wherein applying the adhesive material to the armor tubing comprises: introducing the first material via a first injection tube that extends through the welding zone; introducing the second material via a second injection tube that extends through the welding zone; mixing the first material and the second material to form the mixture; and applying the mixture of the first material and the second material to an inner surface of the armor tubing.

At block 1120, operations 1100 continue with inserting at least one of a first optical fiber or a first wire into a first end of a first guide tube, wherein: the first guide tube extends through the welding zone; the first guide tube protects the at least one of the first optical fiber or the first wire during the welding of the seam; the at least one of the first optical fiber or the first wire contacts the mixture after exiting a second end of the first guide tube; and the first guide tube is not part of the armored cable after the making of the armored cable.

According to certain aspects of the present disclosure, the first injection tube may be secured to at least one of the first guide tube or the second injection tube in operations 1100.

In certain aspects of the present disclosure, the first injection tube, the second injection tube, and the first guide tube are disposed within an outer guide tube in operations 1100. Operations 1100 may include introducing a gas within the outer guide tube.

According to certain aspects of the present disclosure, operations 1100 may further include inserting at least one of a second optical fiber or a second wire into a first end of a second guide tube, wherein: the second guide tube extends through the welding zone; the second guide tube protects the at least one of the second optical fiber or the second wire during the welding; the at least one of the second optical fiber or the second wire contacts the mixture after exiting a second end of the second guide tube; and the second guide tube is not part of the armored cable after the making of the armored cable.

In certain aspects of the present disclosure, the mixing of block 1115 may include introducing the first material and the second material into a static mixer.

Certain aspects of the present disclosure may be suitable for particular sensing applications, and in some cases, may provide for increased sensitivity compared to conventional fiber optic cables. For example, in acoustic sensing applications such as distributed acoustic sensing (DAS), since the optical fibers are attached to an inner wall of the armor tube, the fiber optic cable described herein may offer increased acoustic sensitivity compared to conventional fiber optic cables, where the acoustic signals have to pass through multiple layers of the cable before reaching the optical fibers. The proximity of the optical fibers to the armor tube may also increase sensitivity to thermal conditions external to the fiber optic cable.

It is understood that the specific order or hierarchy of steps in the processes disclosed above is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." For example, unless specified otherwise or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While the foregoing is directed to embodiments of the present disclosure, other and further embodiments of the disclosure may be devised without departing from the basic scope thereof, and the scope thereof is determined by the claims that follow.

The invention claimed is:

1. A method of making an armored cable, the method comprising:
   forming, in a forming stage, an advancing armor tubing from a strip stock being fed to the forming stage;
   welding, in a welding stage after the forming stage, a seam of the advancing armor tubing;
   protecting insertion of at least one first conductor inside the advancing armor tubing by guiding the at least one first conductor through a first guide tube having a first outlet disposed in the advancing armor tubing beyond the welding stage; and
   keeping the first guide tube from contact within the advancing armor tubing by supporting the first guide tube within the advancing armor tubing on a plurality of support legs.

2. The method of claim 1, wherein supporting the first guide tube within the advancing armor tubing on the plurality of support legs comprises:
   holding a support wire on the first guide tube; and
   using at least portion of the support wire as one of the plurality of support legs.

3. The method of claim 2, wherein holding the support wire on the first guide tube comprises wrapping a middle portion of the support wire around the first guide tube; and wherein using at least the portion of the support wire as one of the plurality of support legs comprises using at least one end of the support wire as one of the plurality of support legs.

4. The method of claim 1, wherein supporting the first guide tube within the advancing armor tubing on the plurality of support legs comprises:
   holding first bent portions of a support wire axially along the first guide tube; and
   using second bet portions of the support wire as the plurality of support legs.

5. The method of claim 4, further comprising protecting insertion of at least one second conductor inside the advancing armor tubing by guiding the at least one second conductor through a second guide tube having a second outlet disposed in the armor tubing beyond the welding stage.

6. The method of claim 1, further comprising:
   applying an adhesive material for an interior surface of the advancing armor tubing; and
   permitting the at least one first conductor exiting the first outlet of the first guide tube to adhere to the adhesive material.

7. The method of claim 6, wherein supporting the first guide tube comprises preventing the first guide tube from contacting the adhesive material.

8. The method of claim 6, wherein applying the adhesive material comprises:
   applying a continuous strip of the adhesive material; or
   applying discrete quantities of the adhesive material.

9. The method of claim 6, wherein permitting the at least one first conductor exiting the first outlet of the first guide tube to adhere to the adhesive material comprises:
   adhering a plurality of first portions of the at least one first conductor to a plurality of locations on the interior surface of the armor tubing; and
   leaving a plurality of second portions of the at least one first conductor to remain unadhered inside the armor tubing.

10. The method of claim 6, wherein applying the adhesive material comprises:
    applying the adhesive material to a side of the strip stock being fed to the forming stage; or
    applying the adhesive material inside the advancing armor tubing after the welding stage.

11. The method of claim 6, the at least one first conductor being an optical fiber and/or a wire, wherein the adhesive material is selected from the group consisting of a sticky substance, a tacky substance, a gel substance, silicone, and an attaching substance bonding the optical fiber and/or wire at least partially to an inner wall of the armor tubing.

12. The method of claim 6, wherein applying the adhesive material comprises:
    conducting a first component of the adhesive material through a first injection tube to an area inside the advancing armor tubing after the welding stage;
    conducting a second component of the adhesive material through a second injection tube to the area inside the advancing armor tubing after the welding stage; and
    allowing the first and second components to mix at the area inside the advancing armor tubing.

13. The method of claim 12, wherein conducting the first component through the first injection tube comprises supporting the first injection tube with at least one of the first guide tube or with the second injection tube.

14. The method of claim 12, comprising:
    protecting the first injection tube, the second injection tube, and the first guide tube within an outer guide tube; and
    introducing a gas or a fluid within the outer guide tube.

15. The method of claim 12, wherein allowing the first and second components to mix at the area inside the advancing armor tubing comprises introducing the first and second components into a static mixer connected to the first and second injection tubes.

16. The method of claim 1, further comprising producing, for the at least one first conductor including an optical fiber, an amount of excess fiber length of the optical fiber in the armored cable by controlling a ratio of a fiber feed speed relative to a stock feed speed.

17. A system to make an armored cable from strip stock, the armored cable having at least one conductor, the system comprising:
    a forming stage configured to form an advancing armor tubing from the strip stock being fed to the forming stage;
    a welding stage after the forming stage being configured to weld a seam of the advancing armor tubing;
    at least one guide tube having an outlet disposed in the advancing armor tubing beyond the welding stage, the at least one guide tube guiding insertion of the at least one conductor inside the advancing armor tubing and protecting the at least one conductor past the welding stage; and
    a plurality of support legs disposed on the at least one guide tube and supporting the at least one guide tube inside the advancing armor tubing.

18. The system of claim 17, further comprising an applicator disposed adjacent the strip stock being fed to the forming stage, the applicator configured to apply an adhesive to a side of the strip stock forming an inside surface of the advancing armor tubing.

19. The system of claim 17, further comprising:
    a first injection tube conducting a first component of an adhesive material to an area inside the advancing armor tubing after the welding stage; and
    a second injection tube conducting a second component of the adhesive material to the area inside the advancing armor tubing after the welding stage.

20. The system of claim 19, further comprising a static mixer at the area and configured to mix the first and second components inside the advancing armor tubing.

* * * * *